(12) United States Patent
Wilson

(10) Patent No.: US 6,592,314 B1
(45) Date of Patent: *Jul. 15, 2003

(54) STEEL WASHER INTEGRAL WITH NUT/CAP ASSEMBLY

(75) Inventor: Larry J. Wilson, Commerce Township, MI (US)

(73) Assignee: Industrial and Automotive Fasteners, LLC, Royal Oak, MI (US)

( * ) Notice: Subject to any disclaimer, the term of this patent is extended or adjusted under 35 U.S.C. 154(b) by 0 days.

This patent is subject to a terminal disclaimer.

(21) Appl. No.: 09/685,295

(22) Filed: Oct. 10, 2000

(51) Int. Cl.[7] .................. F16B 37/00; F16B 37/14
(52) U.S. Cl. .............. 411/429; 411/375; 411/432; 411/533
(58) Field of Search ............... 411/375, 429, 411/432, 533, 537, 910

(56) References Cited

U.S. PATENT DOCUMENTS

| | | | | |
|---|---|---|---|---|
| 2,588,372 A | * | 3/1952 | Erg | 411/533 X |
| 4,362,449 A | * | 12/1982 | Hlinsky | 411/537 X |
| 4,969,788 A | * | 11/1990 | Goiny | 411/533 X |
| 4,971,498 A | * | 11/1990 | Goforthe | 411/533 X |
| 4,986,712 A | * | 1/1991 | Fultz | 411/533 X |
| 6,102,488 A | * | 8/2000 | Wilson | 411/375 X |

FOREIGN PATENT DOCUMENTS

GB          2051285    *  1/1981   ............... 411/533

* cited by examiner

Primary Examiner—Neill Wilson
(74) Attorney, Agent, or Firm—Brinks Hofer Gilson & Lione

(57) ABSTRACT

A wheel nut and washer assembly for securing a wheel to a motor vehicle axle. The wheel nut includes a body having a longitudinal axis, the nut body also having an axial threaded aperture and a pair of ends, one end being in the form of a smooth steel external surface. The wheel nut also includes a steel washer having an end terminating in a smooth annular surface in surface-to-surface engagement with the body end thereby maintaining axially alignment of the body and washer enabling relative movement of said body and washer about said axis. A decorative cap on the assembly is configured so that it holds the washer on the nut, a gap between the cap and washer to enable the washer to freely rotate and move laterally relative to the nut.

6 Claims, 3 Drawing Sheets

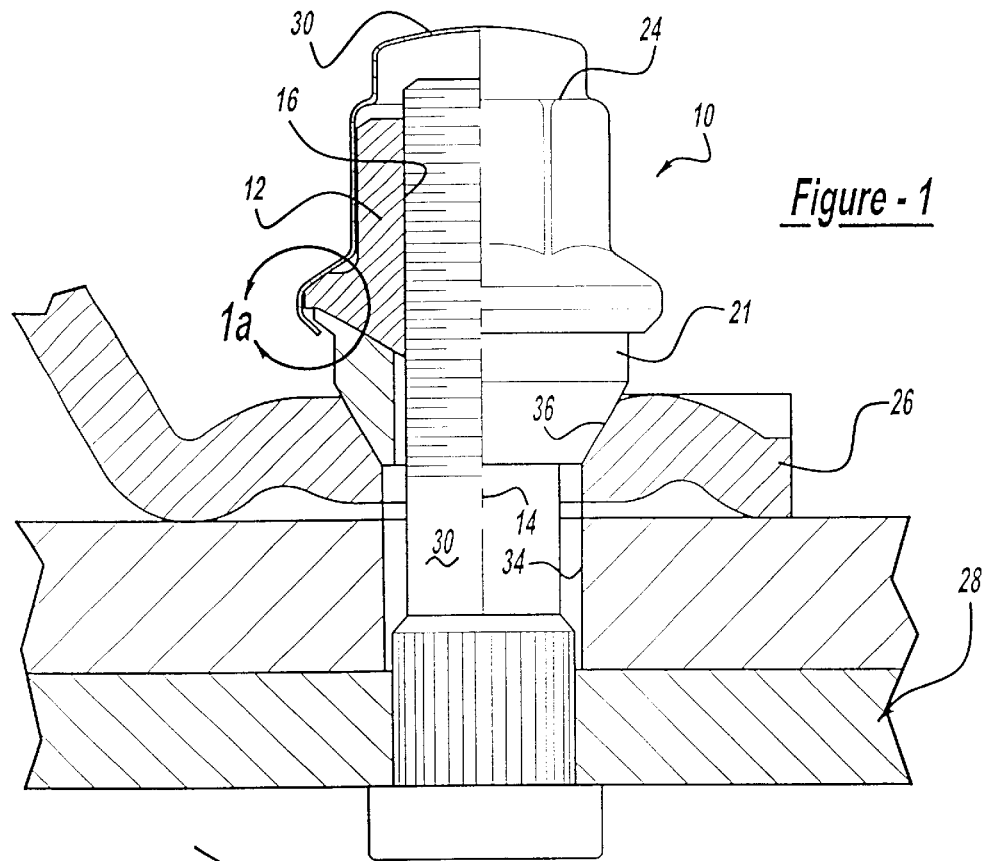
*Figure - 1*
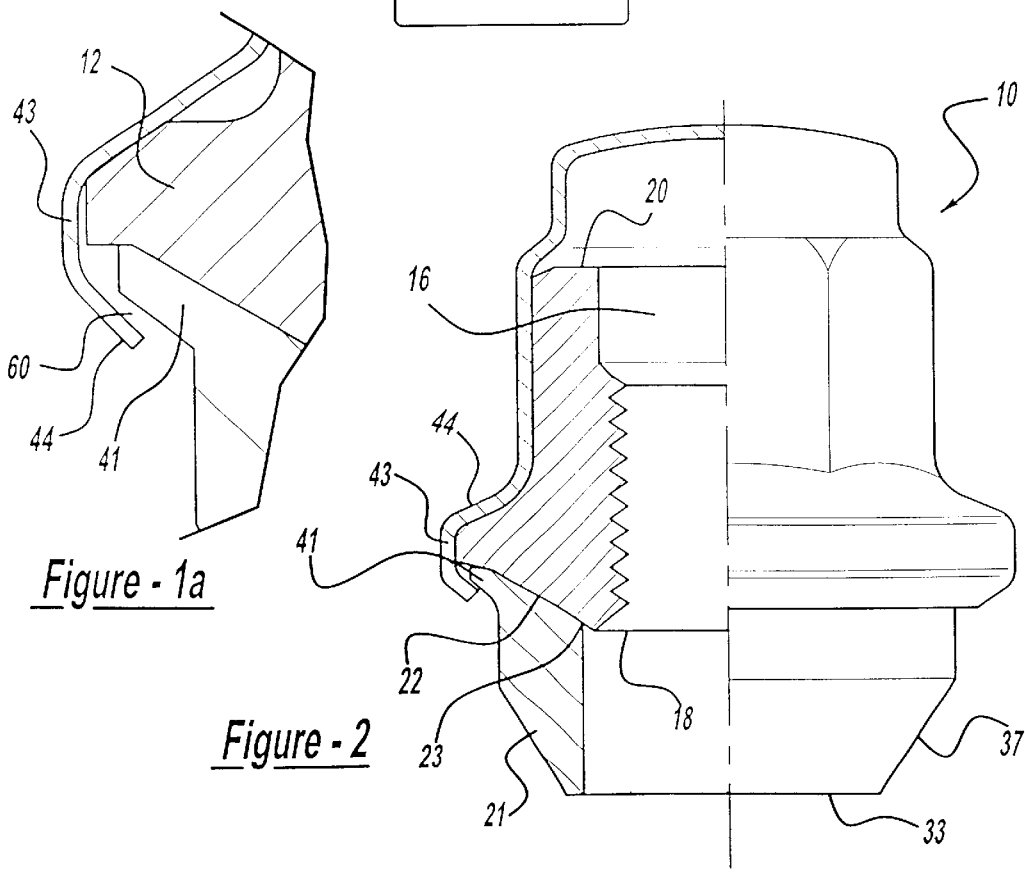
*Figure - 1a*
*Figure - 2*

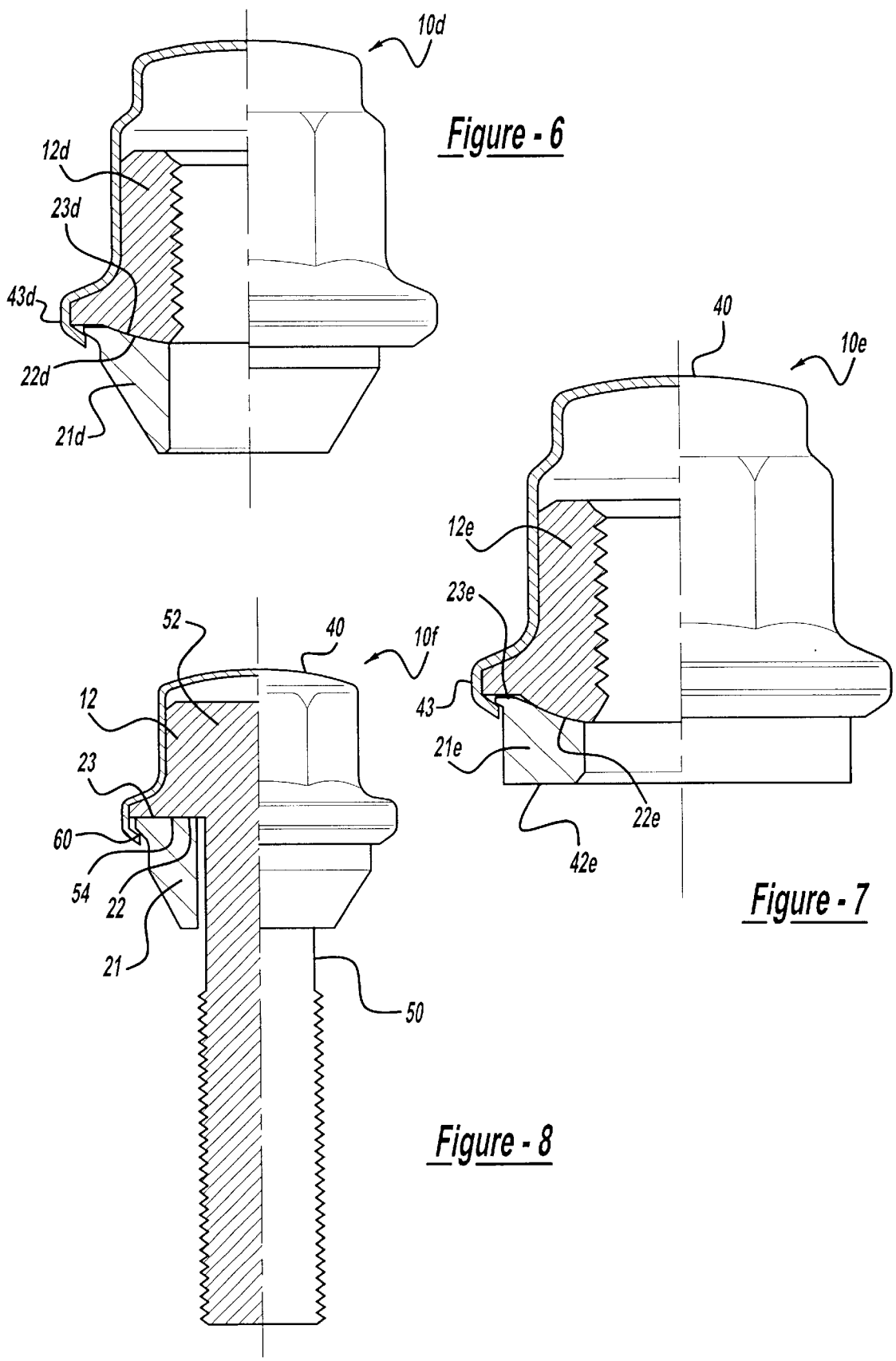

STEEL WASHER INTEGRAL WITH NUT/CAP ASSEMBLY

BACKGROUND AND SUMMARY OF THE INVENTION

This invention relates generally to nut and washer assemblies for mounting wheels on the axles of motor vehicles. More particularly, the nut and washer assembly of this invention is structured to better centrally locate the wheel to the axle of the spindle or hub of the wheel.

Some wheel fastening systems utilize nut and washer assemblies that provide certain advantages over simpler one-piece designs. Since these assemblies cost considerably more than the one piece designs, they tend to be used as a last resort to address joint design or assembly issues. In this invention, a decorative cap on the wheel nut is used to hold the washer or "wheel seat engaging component" to the wheel nut. This eliminates the need for an extra operation to assemble the washer to the nut thereby bringing the cost of the assembly closer to the costs for one-piece structures.

This invention provides an integral washer and nut/cap assembly that will provide more uniform clamp load on the wheel for the applied torque.

The integral washer and nut/cap assembly can be made in several forms. All of the assemblies depicting a flat interface between the threaded nut component and the washer component will better centrally locate the wheel to the axis of the spindle and/or hub as well as provide more uniform clamp load on the wheel for the applied torque. All of the assemblies utilizing a flat interface between the threaded nut component and the washer component will provide both of these benefits. In addition, all washers with a flat bottom surface that mates to the wheel will also provide both benefits regardless of the nut-washer interface.

It is generally known in the industry that a nut and washer can provide better control of mating surface friction in a threaded fastener joint. The consequence is more predictable clamp load on the wheel for the torque applied to the wheel nuts. Commercial benefits such as reduced production costs, exist for the method depicted holding the nut and washer together as an assembly. In this invention, the periphery of the ornamental cap is crimped to hold the nut and washer together. The material of choice is steel for the nut and washer, but other materials with satisfactory physical properties relating to frictional and strength qualities can be used.

Further features, advantages and innovations will be apparent from the following drawings when taken in connection with the specification and the appended claims.

BRIEF DESCRIPTION OF THE DRAWINGS

FIG. 1 is an elevational view of the wheel nut and washer assembly of this invention in assembly relation with a wheel and axle mounting structure with many of the elements shown in cross-section for purposes of clarity;

FIG. 1a is an enlarged fragmentary view of a portion of the nut and washer assembly as designated in the circular arrow 1a in FIG. 1;

FIG. 2 is a cross-sectional view like FIG. 1 showing the improved wheel nut and washer assembly of this invention with conical angular surfaces provided in surface-to-surface contact in the washer and the nut;

FIG. 6 is a sectional view like FIG. 3, but the engaging surfaces on the nut and the washer are of spherical shape;

FIG. 7 is another embodiment of the invention in which the nut and washer mating surfaces are of spherical shape and the opposite face of the nut is flat; and FIG. 8 is an embodiment of this invention in which the face-to-face surfaces are on the washer and a bolt at a location on the underside of the bolt head.

DESCRIPTION OF THE PREFERRED EMBODIMENT

Figure 3:
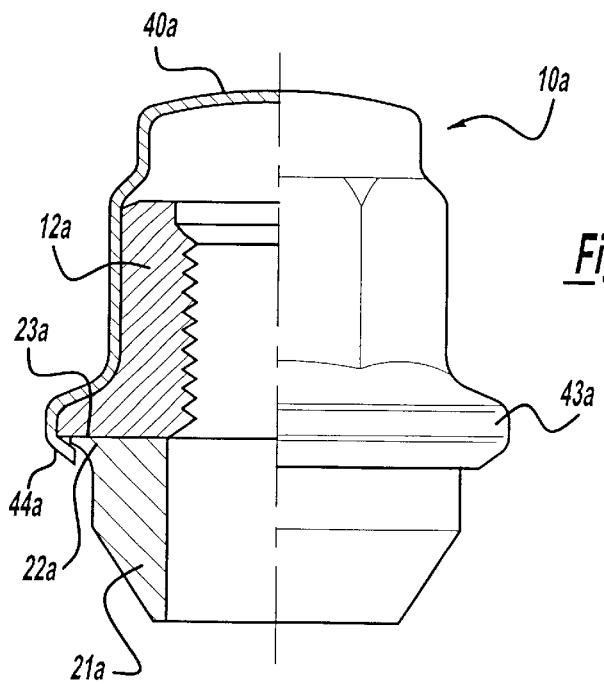
FIG. 3 is a sectional view like FIG. 2 of a wheel nut/washer assembly of this invention except that the face-to-face surfaces on the washer and the nuts are flat.

With reference to the drawing, the wheel/nut and washer assembly of this invention, indicated generally at 10 in FIGS. 1 and 2, comprises a steel body 12 having a longitudinal axis 14 and an axial aperture 16. The body 12 has ends 18 and 20 with a conical surface 22 at the inner end 18 and wrench flats 24 at the outer end 20. A washer 21 made of steel and having an upper end surface 23 of annular shape to lie flat against the conical surface 22. The washer end surface 23 is conical and both surfaces 22 and 23 are smooth surfaces to enhance the ability of the steel body 12 and the steel washer 21 to move relative to each other.

The assembly 10 is shown in FIG. 1 in a position clamping the motor vehicle wheel 26, only a portion of which is shown, against a conventional axle plate 28 secured to the axle in a motor vehicle (not shown). The wheel 26 is provided with a wheel nut seat surface 36 which is of conical shape corresponding to the shape of the conical surface 37 on the wheel end of the washer 21.

The wheel 26 is clamped against the plate 28 by a number of wheel nut/washer assemblies 10 on bolts carried by the axle plate 28, one of which is shown at 30 in FIG. 1. The wheel 26 has a number of openings 34, only one of which is shown in FIG. 1, which are telescoped over the bolts 30. Each opening 34 has a conical nut seat 36 which corresponds in shape to a conical surface 37 on the inner end 33 of the washer 21. The wheel nut/washer assemblies 10 are threaded on bolts 30 to a position in which the conical washer surfaces 37 seat on the seats 36.

A torque force is applied to the wrench flats 24 so as to induce a clamping force on the wheel 26 at the seat surface 36 by the conical surface 37 on each of the washers 21. This invention, will, therefore, provide an integral washer and nut cap assembly that will provide for more uniform clamp loads on the wheel for a given applied torque.

It is to be noted that an ornamental cap 40 extends downwardly on the body 12 and at its lower end the cap is crimped or deformed to function as a clamp 43 (FIG. 1a) because it is bent around an annular protrusion 41 to thereby retain the upper end of the washer 21 in close position to the lower end of the body 12. The cap member 40 is telescoped over said nut/body assembly in axially alignment with the body 12. The crimped portion 43 of said cap member encircles the washer and supports the washer 21 on the body 12. The crimped section 43 acts like an annular clamp having spaced apart jaws 44 (FIG. 1a) limiting movement of the washer 21 in an axial direction away from said body 12. It can be seen that in this invention, the well known decorative cap is made to form a double function, namely, is used to hold the washer on the wheel nut, along with its decorating function.

A small gap or space 60 is provided between the washer and the clamp 43. This gap is critical to the free rotation and lateral movement of the washer 21.

FIGS. 3–8, inclusive, illustrate other embodiments of this invention. The embodiment 10*a* shown in FIG. 3, is identical to the embodiment shown in FIGS. 1 and 2 except for the configuration of the nut 12 and the washer 21. Accordingly, each of the embodiments has like elements and surfaces in the embodiment 10 and are therefor designated like parts with like numerals with a letter suffix assigned each embodiment.

In FIG. 3 the embodiment 10*a* has the mating surfaces 22*a* and 23*a* as flat instead of conical as in the nut and washer assembly 10 in FIGS. 1 and 2.

Figure 4:
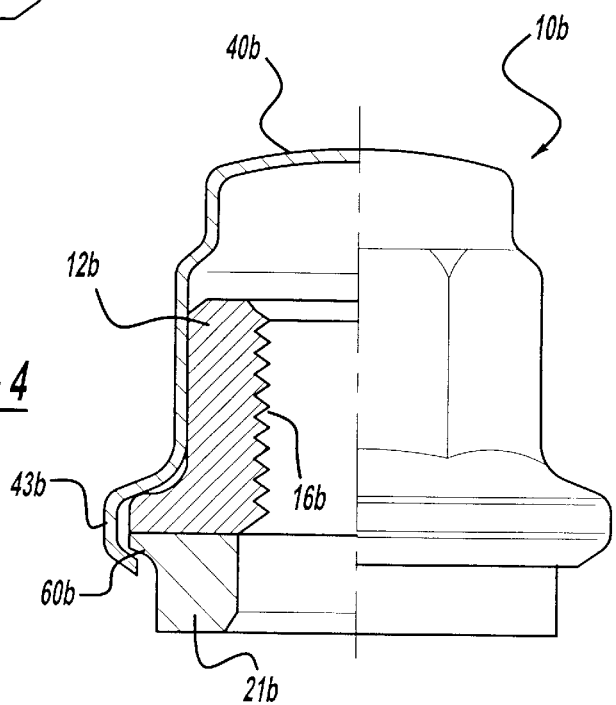
FIG. 4 is a sectional view like FIG. 3 except that both end faces of the washer are flat.

In the embodiment 10*b* shown in FIG. 4, the washer 21*d* is configured so that the inner end surface 42*b* is flat and parallel to the surface 23*b*. This embodiment is used on a wheel with a complementary flat mating surface.

Figure 5:
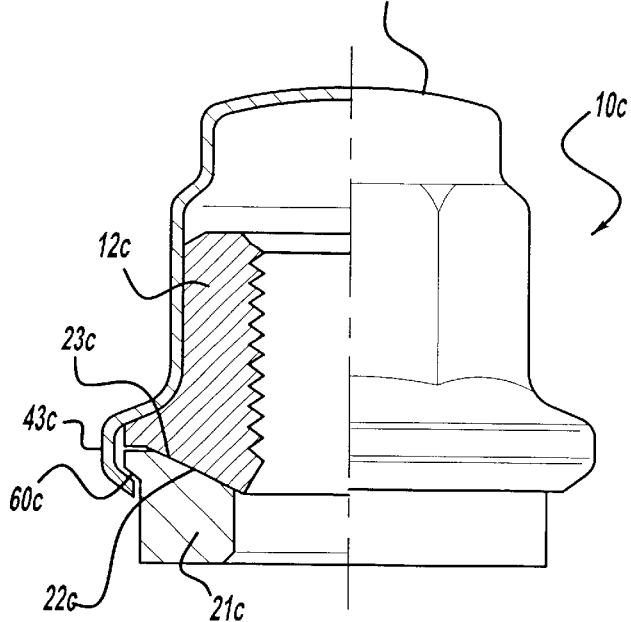
FIG. 5 is a sectional view like FIG. 4 but the washer surface that is in face-to-face engagement with the nut is conical and the opposite face of the washer is flat.

In the embodiment 10*c* shown in FIG. 5, the components are identical to the embodiment shown in FIG. 4 except that the mating surfaces 22*c* and 23*c* are conical instead of flat.

FIG. 6, depicts another embodiment 10*d* which has an inner component 12*d* like the nut body 12 shown FIGS. 1 and 2. A washer 21*d* or "wheel seat engaging component" in the external cap 40 that provides the means by which the nut 12*d* and the washer 21*d* are held together with a crimp in the cap 40 to form the clamp 43. The embodiment shown in FIG. 6 has the same components but the faces 22*d* and 23*d* on the nut 12*d* and the washer 21*d* that are in face-to-face contact are spherical.

The embodiment 10*e* shown in FIG. 7 is identical to embodiment 10*d* except that the wheel seat engaging surface 42*d* is flat.

Turning now to the embodiment 10*f* shown in FIG. 8. It consists of a bolt 50 having a head 52 and a decorative cap 40 along with a washer 21. The under side of the head consists of a flat surface 54. In turn, the washer has a flat surface 23 which is in face-to-face engagement with the surface 54 on the bolt. The crimp 43 in the cap 40 acts to hold the flat surfaces 23 and 24 in face to face engagement.

From the above disclosure it is evident that this invention provides wheel nuts and washer assemblies 10, 10*a*, 10*b*, 10*c*, 10*d*, 10*e* and 10*f* which can be effectively used to attach wheels so that a maximum torque can be applied to the wheel nuts, resulting in a consistent clamp load to hold the wheels on the motor vehicle and with certain alignment because the nuts and washers can move with the respect to each other. The same advantages are seen when the cap 40 holds the washer 21 on the bolt 50.

What is claimed is:

1. A wheel nut and washer assembly comprising:
   a) a steel body having a longitudinal axis, said body also having an axial threaded aperture and a pair of ends with a smooth external surface on one of said ends;
   b) a washer axially aligned with said threaded body, end-to-end in surface-to-surface relation with said threaded body, and a smooth surface on said washer which is in engagement with said smooth surface on said body thereby enabling relative movement of said washer and said body in a circular path around said axis; and
   c) a cap member telescoped over said body in axial alignment with said body, and a portion of said cap member encircling said washer and supporting said washer on said body.

2. The wheel nut and washer assembly set forth in claim 1 wherein said cap member portion is in the form of an annular clamp having spaced apart jaw sections limiting movement of said washer in an axial direction away from said body.

3. The wheel nut and washer assembly set forth in claim 1 wherein said clamp provides a gap with said washer enabling movement in said circular path and laterally of said axis.

4. The wheel nut and washer assembly set forth in claim 1 wherein said smooth surfaces are flat.

5. The wheel nut and washer assembly set forth in claim 1 wherein said smooth surfaces are conical.

6. The wheel nut and washer assembly set forth in claim 1 wherein said smooth surfaces are spherical.

* * * * *